US011238694B2

(12) United States Patent
Huke et al.

(10) Patent No.: US 11,238,694 B2
(45) Date of Patent: Feb. 1, 2022

(54) REAL TIME ACTION OF INTEREST NOTIFICATION SYSTEM

(71) Applicant: AdrenalineIP, Washington, DC (US)

(72) Inventors: Casey Alexander Huke, Washington, DC (US); John Cronin, Jericho, VT (US); Michael D'Andrea, Burlington, VT (US); Joseph Bodkin, Quincy, MA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/078,502

(22) Filed: Oct. 23, 2020

(65) Prior Publication Data

US 2021/0256797 A1 Aug. 19, 2021

Related U.S. Application Data

(60) Provisional application No. 62/976,486, filed on Feb. 14, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/323* (2013.01); *G07F 17/3211* (2013.01)

(58) Field of Classification Search

USPC .............................. 463/1, 20, 22, 31, 39, 42

See application file for complete search history.

(56) References Cited

U.S. PATENT DOCUMENTS

| | | | | |
|---|---|---|---|---|
| 9,076,305 | B2 * | 7/2015 | Amaitis | G07F 17/3288 |
| 2002/0054088 | A1 * | 5/2002 | Tanskanen | H04N 7/17318<br>715/744 |

OTHER PUBLICATIONS

Notification of Transmittal of the International Search Report and the Written Opinion of the International Searching Authority, or the Declaration dated Apr. 1, 2021, in connection with corresponding International Application No. PCT/US2021/017177; 7 pages.

* cited by examiner

*Primary Examiner* — Adetokunbo O Torimiro
(74) *Attorney, Agent, or Firm* — Maier & Maier, PLLC

(57) ABSTRACT

A method of identifying wagers trends from a user's wagering history in order to alert the user of similar wagers that are available. The user interacts with a betting platform which displays all of the live plays available to be wagered upon, and the odds of those wagers. The user's interaction with the application may be recorded, along with their wagering data and a plurality of play characteristics. As the betting platform receives a new live play available to be wagered on, it may compare the characteristics of the new play to the user's history and may notify the user of the new play if it is highly correlated with their past wagering interactions with the platform.

16 Claims, 2 Drawing Sheets

Context - High Level Diagram

Betting Module

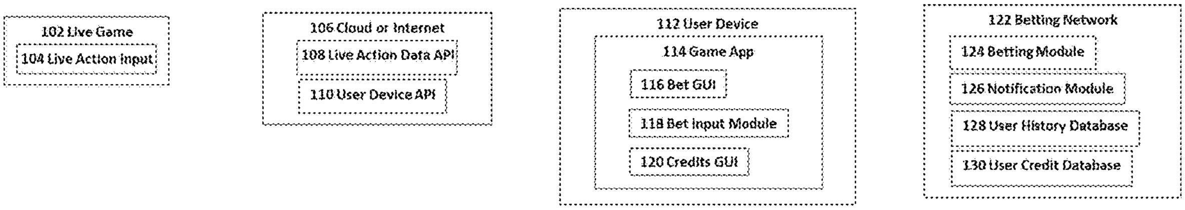
Fig. 1 Content - High Level Diagram
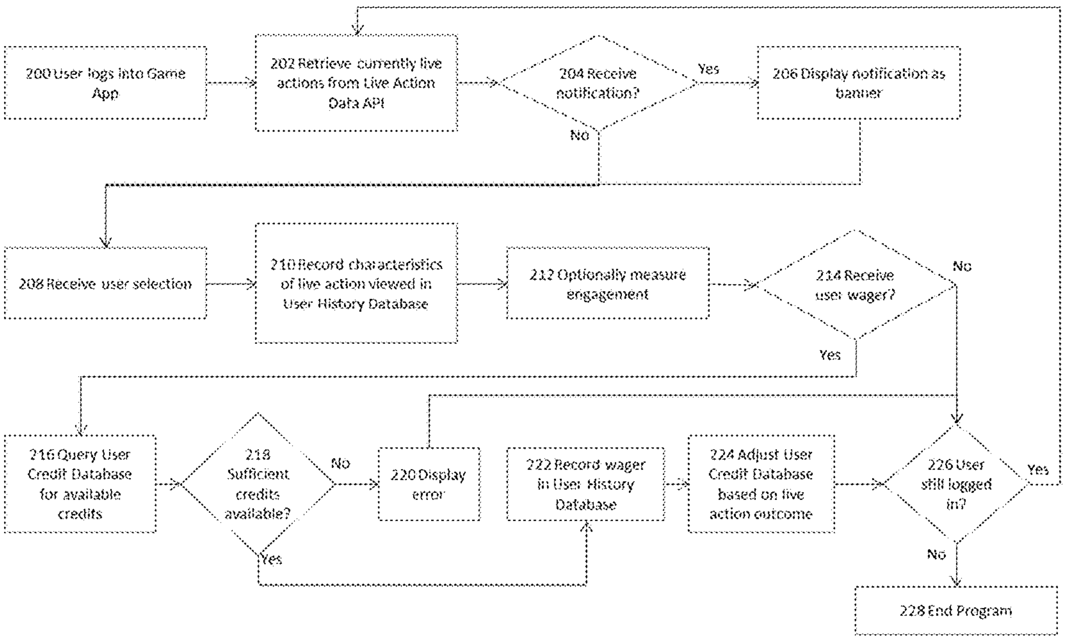
Fig. 2 Betting Module

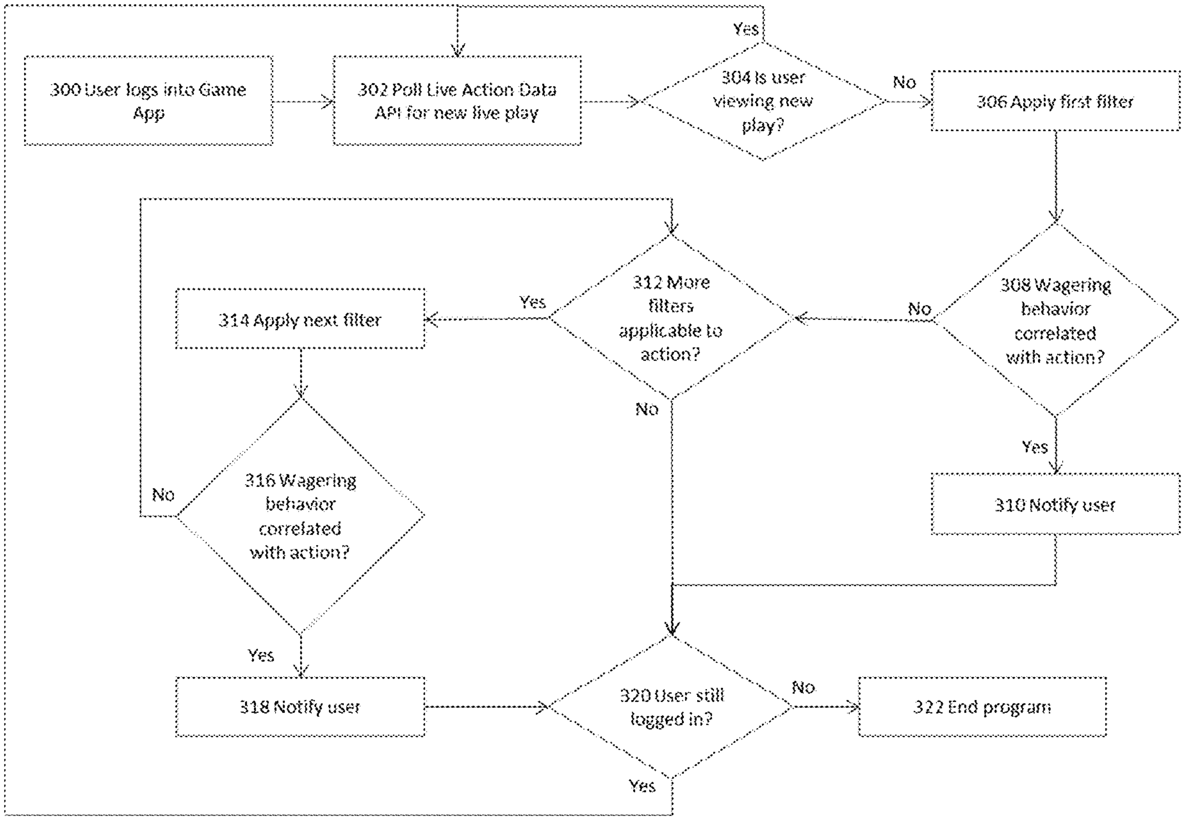
Fig. 3 Notification Module
| Action | Wager/View | Odds | Wager Amount | Distance | Offense | Defense | Home Team | Road Team | ... | Temperature |
|---|---|---|---|---|---|---|---|---|---|---|
| 1 | View | +124 | | 3 | NYG | CHI | CHI | NYG | | 32° F |
| 2 | View | +140 | | 5 | NYG | CHI | CHI | NYG | | 32° F |
| 3 | Wager | +180 | 500 | 7 | NYG | CHI | CHI | NYG | | 31° F |
| 4 | Wager | +170 | 200 | 6 | PIT | CLE | PIT | CLE | | 72° F |
| 5 | Wager | +185 | 1000 | 8 | NYG | CHI | CHI | NYG | | 30° F |
| ... | | | | | | | | | | |
| n | View | +165 | | 1 | CLE | PIT | CLE | PIT | | 52° F |
Fig. 4 User History Database

REAL TIME ACTION OF INTEREST NOTIFICATION SYSTEM

FIELD

Embodiments are generally related to online betting platforms for single action wagering on sporting events.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Play by play wagering happens very rapidly and there are often multiple events occurring simultaneously, such as Sunday afternoons during American football season, when as many as a dozen games are occurring simultaneously. With a forty second play clock, there is very little time to determine which wager or wagers a user is interested in, understand the odds and make a decision based on the available information. Currently in the art there is no solution to allow users to be notified of potential wagers that they may be interested in. Also, in the art there is no solution for users to be able to filter currently available wagers that are similar to wagers the user has previously wagered on.

SUMMARY

The embodiments describe methods, systems and apparatuses for providing notifications. One embodiment provides a computer implemented method of alerting a user of a wager, including retrieving by a server, characteristics of a live action regarding a live event, comparing the live action characteristics to data in a historical database related to previous actions of a user, determining if any characteristics of the live action are highly correlated with one of the historical interest or a preselected option, applying at least one filter to wagering activity of a user based upon a second characteristic of the live action, determining if any two characteristics of the live action are highly correlated with the user's historical interest, and outputting on a display of the communication device a notification of the live action when it is correlated to the historical interest of the user.

Another embodiment provides a computer implemented method for providing notifications in a game program, including executing on a processor the steps of displaying at least one of a first real time event and data associated with the first real time event in a wagering game on a user device; displaying a notification that one or more wagers for wagering in a second real time event in a wagering game correlated to a historical interest of a user of a wagering game are available on the user device; displaying the one or more wagers in the real time event correlated to the historical interest of the user; displaying information about a play in the live event; and displaying results of a wager from the one or more real time wagers.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: Illustrates a Real Time Action of Interest Notification System, according to an embodiment.

FIG. 2: Illustrates a Betting Module, according to an embodiment.

FIG. 3: Illustrates a Notification Module, according to an embodiment.

FIG. 4: Illustrates a User History Database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

This is a system for a real time action of interest notification system. This system includes at least two live games, for example a sporting event such as a football game, basketball game, baseball game, hockey game, tennis match, golf tournament, etc. The live event will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have an amount of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events in the future. Sportsbooks need to offer payment processing services in order to cash out customers. This can be done at kiosks at the live event or at another location, in element 102. A live action input module that receives data about each individual action in the game, for example which players were involved in an action during a sporting event. In some embodiments, an action may be a specific play or specific event in a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, in element 104. This system may also include a cloud or communication network which may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art, in element 106. Included in the system may be an API for delivering data from the live game to the betting network, in element 108. Also, an API for delivering data between the betting network and the user device may be included within the system, in element 110. The system may also include a user device for connecting to the cloud or internet and running the game app. A user device may be a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wiimote for the WIT, Nintendo WII U GAMEPAD, or Apple IPHONE. Some devices allow gesture recognition inputs through combining some of the inputs and outputs. Some devices provide for facial recognition which may be utilized as an input for different purposes including authentication and other commands. Some devices provides for voice recognition and inputs, including, e.g., Microsoft KINECT, SIRI for IPHONE by Apple, Google Now or Google Voice Search.

Additional devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fibre Channel bus, or a Thunderbolt bus. The user device can leverage the sensors in for purposes such as automatic content recognition, augmented reality or the synchronization of screens between the user device interface and other displays, in element 112. Included in the system may be a game app that displays the odds for the next action of the live game, allows the user to place a bet, and displays the user's credits, in element 114. The system may include a bet GUI that displays the possible betting options and odds for each betting option, the odds determine the ratio of credits bet to credits returned if the bet was correct, in element 116. Included in the system may be a bet input module that allows the user to choose to bet credits on one or more options, in element 118. The system may include a credits GUI that display's the user's current amount of credits in the credit database, which may increase or decrease and may be tied to a real money value or to a point system, in element 120. The system may include a betting network which provides an artificial intelligence-based software module that monitors the user's history of viewing and making wagers through the game app in order to identify actions that are highly correlated with actions the user has previously viewed or wagered on. The betting network may be located on a server which may perform real time analysis on the type of play and the result of a play or action. The server, or cloud, may also be synchronized with game situational data, such as the time of the game, the score, location on the field, weather conditions, and the like which may affect the choice of play utilized. For example, in other exemplary embodiments, server may not receive data gathered from sensors and may, instead, receive data from an alternative data feed, such as Sports Radar. This data may be provided substantially immediately following the completion of any play and the data from this feed may be compared with a variety of team data and league data based on a variety of elements, including down, possession, score, time, team, and so forth, as described in various exemplary embodiments herein. The server can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can provide engaging promotions to the user, in element 122. The system may include a betting module that allows the user to view available live actions to wager on, select those actions that interest them and wager credits or funds available to them in element 124. The system may include a notification module that monitors live actions available to be wagered on, then compares characteristics of those available live actions to actions the user has previously viewed or wagered on in the past, such as a third down and between 7 and 10 yards to go for a first down involving the New York Giants on the road, and deliver a notification through the game app that such an action is available to be wagered upon. In some embodiments, a user may select potential wager options of interest that they can be notified about when the wager option is available. In some embodiments, the notification may be a push notification, text message, e-mail, banner notification, voice message, or the like, in the event the user in not currently in the game app or is not logged into the game app, in element 126. The system may also include a user history database that houses the characteristics of all actions the user has either viewed or wagered on in element 128. Also, the system may include a user credit database that houses the credits or funds the user has available to wager in element 130.

Functioning of the betting module will now be explained with reference to FIG. 2. One of ordinary skill in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the betting module. The process begins with user logging into the game app on their device, at step 200. The betting module retrieves from the live action data API all the available live actions available and the odds available on them, that are calculated in the manner described in US20190197836 "Method, System and Computer Program Product for Sports Game", which is incorporated by reference herein its entirety, by receiving the results of a first play and comparing the play results to a plurality of predetermined factors to determine if the play is complete and determining wagers based on the first play result information and historical play information related to a plurality of factors in the play result information, at step 202. Then the betting module is continuously polling the notification module for an available live action that is correlated with the present user's history, at step 204. If a notification is received, that action is displayed as a banner notification across the top of the game app's present user interface screen, at step 206. The betting module receives the user's selected available live action to potentially wager on, at step 208. The betting module records the characteristics of the action being viewed, such as down and distance, teams involved, location, weather, etc., in the user history database, at step 210. In this embodiment the system measures wagers viewed and wagers made, a wager made may be considered more indicative of future behavior, for example five times more, than a wager viewed. However, there are many ways known in the art to measure a user's engagement with content on a device such as a smartphone or tablet. One or more of these methods, such as time on screen, eye gaze tracking, etc., could be used to score wagers viewed on a sliding scale between the one and five used in the present embodiment, at step 212. It is then determined if the user wagered on the live play, if the user did not wager on the live play then the process proceeds to step 226, at step 214. If the user did select to wager on the live play, query the user credit database for the credits, or funds, available to the user, at step 216. It is then determined by the betting module if there are sufficient credits or funds available to the user to make the selected wager, at step 218. If the user does not have sufficient credits or funds available to them, display an error message that allows the user to change their wager amount or add credits or funds to their account at step 220. If the user has sufficient credits or funds available to them, record the wager in the user history database at step 222. The user's account balance is adjusted in the user credit database based on the outcome of the live action and the wager parameters, at step 224. It is then determined if the user is still logged in to the game app, at step 226. If the user is still logged in the process returns to step 202, however if the user has logged out, the program ends, at step 228. It should be noted that the betting module can be made available for access, reconfiguration, modification, or control for "customers" or used for "managed service user interface service", "managed service risk management services", "managed service compliance service", "managed service pricing and trading service", "managed service and technology platform", "managed service and marketing support services", "payment processing services", "business applications", "engaging promotions", "customized betting", "business applications", "state based integration", "game configurator", "fantasy sports connector", "software as a service", "synchronization of screens", "automatic content recognition (ACR)", "joining social media", "Augmented reality", "digital gaming", "Esports" or for user's to "cash out".

Functioning of the notification module will now be explained with reference to FIG. 3. One of ordinary skill in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the notification module. The process begins with the user logging into the game app on their user device at step 300. The module then polls the live action data API for a new live action available to be wagered on at step 302. It is then determined if the user is viewing the live action received from the live action data API. This is done because the system prevents sending the user a notification to view an action that they are already viewing. In this scenario the module will return to step 302, at step 304. If the live action received is not being viewed by the user, a first filter is applied to the user's historical wagers made and wagers viewed in the user history database. In this embodiment the first filter is the distance from a first down for the offense in an American football game. In this exemplary embodiment regarding American football, it may be understood that an action may be a form of football play or other occurrence associated with an American football game. The live play received from the live action data API is a 3rd down with 7 yards to go for the New York Giants against the Chicago Bears in the third quarter of their game in Chicago in which the Bears are leading 10-7. The first filter applied in this example, to the user's data in the user history database is for actions with between 7 and 10 yards to go until first down at step 306. The notification modules determines if the user has a wagering behavior in their history that is correlated with the filtered data. For example, the current live play is 7 yards to go for the first down. All plays with between 7 and 10 yards to go that the user either viewed and/or wagered on are retrieved from the user history database and the correlation between the odds on the current live play and the user's wagering/viewing history is calculated. The notification threshold may be a predetermined threshold, that may be determined by the operators of the betting network, which is correlating past wagers made and viewed by the user to the current play that is available to be wagered on. If the data points between the user's history and the current play, for example the distance to go, the down, the team involved, etc., are highly correlated and exceed the predetermined threshold the user will receive a notification about the current play and available wager. However, if the data points are not correlated and do not exceed the predetermined threshold the user will not receive a notification. The data points are correlated by calculating a correlation coefficient which represents the linear dependence of two variables or sets of data. The notification threshold may vary from filter to filter and user to user based on the sample size available and how sensitive the operators of the betting network determine the threshold. The operators of the betting network may set the notification threshold for notifying a user when only the distance filter is applied at a correlation coefficient of 0.90. For example, a user's history of wagers made, and wagers viewed shows a high correlation coefficient, 0.92 for actions where there are fifteen to twenty yards to go for a first down. The present play has between seven and ten yards to go for a first down, which is not highly correlated enough with the user's wagering history at step 308. If the user's history is highly correlated with the current play and odds a notification is sent to the user at step 310. The notification module then determines if there are more filters that can be applied, at step 312. In this example, after the distance filter, of 7-10 yards, is applied first, the next filter would be applied, such as which down the play is occurring, for example 3$^{rd}$ down. Additional filters may be applied, for example which teams are involved in the play, such as the New York Giants, at step 314. It is then determined if the user has a wagering behavior in their history that is correlated with the multiply filtered data. For example, the current live play is 7 yards to go for the first down. All 3rd down plays with between 7 and 10 yards to go that the user either viewed and/or wagered on are retrieved from the user history database and the correlation between the odds on the current live play and the user's wagering/viewing history is calculated. The user's wagering history shows a correlation coefficient of 0.81, which falls below the notification threshold of 0.85 for two filters. However, when the additional filter that includes games involving the New York Giants, is applied, the correlation coefficient goes to 0.82 which exceeds the notification threshold of 0.80 at step 316. If the user's history is highly correlated with the current play and odds a notification is sent to the user. The threshold for notification is going to vary from filter to filter and user to user based on the sample size available and how sensitive the operators. The threshold for correlation will have to drop as more filters are applied as the sample size will decrease, so the operators may set the correlation coefficient threshold for two filters at 0.85, and three filters at 0.80 and four or more filters at 0.75. When the multiply filtered dataset exceeds the correlation coefficient threshold, the user is notified of the pending play at step 318. The notification module then determines if the user is still logged into the game app at step 320. If the user is still logged into the game app after at least two filters have been applied to the user history database, the notification module will return to step 312. If there are more filters available, the module will return to step 302, but if there are no more filters to apply and the user has logged out the program will end, at step 322.

Functioning of the user history database will now be explained with reference to FIG. 4. One of ordinary skill in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the user history database. The database contains one table for each registered user of the game app. That table collects data about each wager the user views and wagers on. That data includes but is not limited to, the teams involved, where the game is being played, the distance to go for a first down, what down it is, the odds, the weather, etc. This data is used to calculate correlations between the type of bet available and the user's wagering history. In this example a wager is counted as five instances of viewing a wager so as to give weight to both. In this fashion the wagers a user takes the time to view are still counted towards the types of wagers they are interested in, but wagers they actually gamble on are given significantly more weight. The five to one ratio is chosen as an example in this embodiment and the ratio would be determined by the system operators. Optionally the user's level of engagement with viewed but not gambled upon wagers can be measured so as to scale the value of wagers the user views based on their level of interest. For example, a wager the user strongly considered, as measured by engagement, could count for three views. In some embodiments, the user may be able to view the user history database and select past wagers or data points from previous wagers, such as the odds, team involved, etc., in order to be notified when these occur again. This may be accomplished by storing the user selections in a separate database and the each current live play would be compared to the database in order to determine if any of the fields are a match, for example the odds provided, the teams involved, the down, distance to gain, etc. If there is a match then a notification will be sent to the user in order to alert them of the available wager, at element 400. Other examples of wager data can be a "bet", "wager", "buy points", "price", "no action", "sides", "longshot", "opening line", "favorite", "chalk", "circled game", "laying the points price", "dog", "underdog", "money line", "straight bet", "straight-up", "line", "cover the spread", "cover", "tie", "pick", "pick-em", "middle", "parlay", "round robin", "teaser", "prop bet", "first-half-bet", "half-time-bet", "listed pitchers", "run line", "futures bet", "future", "handle", "juice", "vigorish", "off the board" or "customized betting".

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method of alerting a user of a wager on a simultaneous live event, comprising:

retrieving by a server, characteristics of a live action regarding the simultaneous live event, comparing the live action characteristics to data in a historical database related to previous actions of a user, determining if any characteristics of the live action are highly correlated with a historical interest derived from data in the historical database or a preselected option, applying at least one filter to wagering activity of a user based upon a second characteristic of the live action, outputting on a display of a communication device a notification of the live action when it is correlated to the historical interest of the user and upon a determination that the user is one of viewing, on the communication device, a primary live event other than the simultaneous live event or interacting with data associated with the primary live event on the communication device.

2. The computer implemented method of claim 1, wherein the live action characteristic is an action by at least one of a team and a player in the simultaneous live event.

3. The computer implemented method of claim 1, wherein the live action characteristic is situational data in the simultaneous live event.

4. The computer implemented method of claim 1, further comprising determining if the any characteristics of the live action are correlated with the historical interest of the user by utilizing one or more filters.

5. The computer implemented method of claim 4, wherein the one or more filters are set automatically.

6. The computer implemented method of claim 4, further comprising setting a threshold level associated with the one or more filters to determine if the any characteristics of the live action are correlated with the historical interest of the user.

7. The computer implemented method of claim 4, wherein the one or more filters correspond to one or more actions in the historical interest of the user where the user placed a wager.

8. The computer implemented method of claim 4, wherein the one or more filters correspond to one or more actions in the historical interest of the user where the user viewed a wager a predetermined number of times.

9. The computer implemented method of claim 8, further comprising determining if the any characteristics of the live action are correlated with the historical interest of the user by comparing filters of the historical interest of the user in a hierarchical manner until a threshold for correlation is met.

10. The computer implemented method of claim 9, further comprising decreasing the threshold for correlation as a number of the filters compared is increased.

11. The computer implemented method of claim 1, wherein the historical interest is derived from data associated with past available wagers viewed but not placed and data associated with past wagers placed, and wherein the data associated with past wagers placed is weighted more than data associated with past wagers viewed but not placed.

12. The computer implemented method of claim 1, further comprising determining if the user is viewing the live action of the simultaneous event on the communication device.

13. A computer implemented method for providing notifications in a game program, comprising executing on a processor the steps of:

displaying at least one of a primary real time event and data associated with the primary real time event in a wagering game on a user device;

displaying a notification that one or more wagers for wagering in a simultaneous real time event in a wagering game correlated to a historical interest of a user of a wagering game are available on the user device;

displaying the one or more wagers in the simultaneous real time event correlated to the historical interest of the user; and displaying information about a play in the simultaneous real time event.

14. The computer implemented method for providing notifications in a game program of claim 13, further comprising displaying historical interest data of the user.

15. The computer implemented method for providing notifications in a game program of claim 13, wherein the historical interest is derived from data associated with past available wagers viewed but not placed and data associated with past wagers placed, and wherein the data associated with past wagers placed is weighted more than data associated with past wagers viewed but not placed.

16. The computer implemented method of claim 13, further comprising determining if the user is viewing the simultaneous real time event on the user device.

* * * * *